Patented June 15, 1948

2,443,224

UNITED STATES PATENT OFFICE 2,443,224

COMPOUND FOR TREATING PRODUCE AND METHOD OF MAKING SAME

Benjamin R. Burgess and Millie M. Burgess, Watsonville, Calif.

No Drawing. Application November 6, 1944, Serial No. 562,256

4 Claims. (Cl. 99—156)

Our invention relates generally to compounds used for treating fruits and vegetables.

In present day practice fruits and vegetables are shipped for great distances, consuming from twelve to fourteen days in the case of shipping such produce from California to the eastern seaboard, with the result that the saleability of such produce upon reaching its destination has been materially impaired through the action of bacteria moulds and particularly in the case of vegetables, such as lettuce and celery, and other greens subject to wilting have lost their fresh appearance, the latter being true also with respect to various kinds of fruit.

It is an object of the present invention to provide a compound or product which may be used for treating fruit and vegetables so that the same will retain a fresh appearance over an extended period and which at the same time inhibits or prevents the action of mould or decay.

It is an object of the present invention to provide a simple method of producing the compound from available materials at low cost so as to provide a compound in which the desired agents may be readily applied to the treatment of fruits and vegetables at a low cost.

Other objects and advantages will appear hereinafter from the following description.

This invention is particularly directed to a compound or product for treating produce as, for instance, fruit and vegetables, berries and the like, by using a solution of such compound, of the character hereinafter described, which is applied to the produce in apparatus readily available at packing plants, such as the ordinary washing tank or spraying apparatus.

Various attempts have been made to use various agents generally for the purpose of either cleaning the fruit or inhibiting mould and decay, and while in some cases such agents have been effective for short periods of time, we are able with the particular compound described herein to inhibit the growth of mould and bacteria and to retain the fresh appearance of the produce over a length of time sufficient to enable the shipping of produce treated with our agent throughout the country. In fact, from actual commercial operations, produce treated with our compound has retained its normal freshness from three to five days longer than produce which has been treated by other present known methods.

A further result accomplished by the use of our compound is that the produce may be permitted to mature and ripen before packing and shipping.

Our product or compound contains ingredients certain of which have the action of inhibiting or preventing mould and decay of the produce. The compound contains sulphur ingredients which inhibit the growth of bacteria and micro-organisms on the surface of the produce, while another ingredient has an astringent action upon the exposed surface of the produce acting upon the cells of the produce to slightly reduce the respiratory action of the cells, thereby permitting a further slow ripening action of the produce. The latter ingredient just referred to is preferably calcium oxide, whereas the active ingredients first above mentioned are sulphides of sulphur and thiosulphate sulphur. These ingredients are resultant from the treatment of ordinary sulphur, calcium oxide, and magnesium sulphate in the following manner.

Approximately 1 lb. of ordinary sulphur, 2 lbs. of calcium oxide, and 1 lb. of magnesium sulphate or Epsom salts are thoroughly mixed. The resultant mixture is then heated in a pot or in any suitable manner to 350° F. for a period of approximately three hours. It will be understood that this approximate temperature of 350° F. having been reached, the heating period may extend somewhat over three hours without any appreciable effect on the results obtained during the heating operation.

An analysis of the soluble constituents of the the compound produced from the materials by the method just described on the basis of a 1 to 10 solution, as an example, is as follows:

|  | Figured on the basis of solution | Figured on the basis of original sample |
|---|---|---|
|  | Per cent | Per cent |
| Monosulphide sulphur S | .403 | 4.03 |
| Total sulphide sulphur S | 1.380 | 13.80 |
| Sulphur as thiosulphate S | .267 | 2.67 |
| Sulphur as sulphate S | .297 | 2.97 |
| Total sulphur S | 1.944 | 19.44 |
| Calcium oxide CaO | 1.400 | 14.00 |
| Magnesium oxide MgO | .138 | 1.38 |

It is further to be understood that the proportion of the ingredients of the mixture may vary by increasing or decreasing the amount of sulphur or lime. Any such variation in the proportions of the ingredients may be compensated by varying the strength of the treating solution made with such compound, but it is important that the solution made should have a pH of from 8½ to 10.

This solution referred to is made by mixing the resultant product of the heating operation with water and agitating the mixture. As an example of an efficient solution for the purposes indicated which has the proper pH, one part of the compound to 128 parts of water has produced in commercial operations the desired results above referred to.

The solution, when applied to the produce, either by a bath operation or spraying operation, forms what may be termed a protective pervious coating for the produce and reduces the respirative action due to the slight astringent action of the lime as above mentioned, the sulphur sulphides in the solution controlling the bacteria and micro-organisms which are externally present on fresh fruits and vegetables which are responsible for moulds and decay.

By the use of the compound hereinabove described the period of freshness of the produce is materially extended, the color is stabilized and the natural vitamins retained and the natural acids and solids maintained for an extended period.

While I have described a particular example or the compound and the method of producing same, it is to be understood that various changes and modifications can be made without departing from the scope of the invention and it is intended to cover such changes and modifications as come within the scope of the claims.

We claim as our invention:

1. In a method of producing a compound for treating produce which consists in mixing in approximate proportions by weight sulphur 1 lb., calcium oxide 4 lbs., and magnesium sulphate 1 lb., and heating such mixture to a temperature of approximately 350° F. for a period of not less than approximately three hours.

2. A water soluble compound for use in forming an aqueous solution for treating produce to prolong the fresh appearance thereof by acting to retard the ripening of the produce and to inhibit the growth of mold and micro-organisms comprising the reaction product obtained by heating a mixture of sulphur, calcium oxide and magnesium sulphate in the approximate proportions of one pound of sulphur, four pounds of calcium oxide and one pound of magnesium sulphate to a temperature of approximately 350° F. for a period of approximately three hours.

3. A water soluble compound for use in forming an aqueous solution for treating produce to prolong the fresh appearance thereof by acting to retard the ripening of the produce and to inhibit the growth of mold and micro-organisms comprising the reaction product obtained by heating a mixture of sulphur, calcium oxide and magnesium sulphate to a temperature of approximately 350° F. for a period of approximately three hours, the proportion of calcium oxide being substantially greater than the proportion of either of the other two ingredients.

4. The method of prolonging the fresh appearance of produce by inhibiting ripening thereof and the growth of mold and micro-organisms which comprises subjecting the produce to a bath of an aqueous solution of the reaction product obtained by heating a mixture of sulphur, calcium oxide and magnesium sulphate to a temperature of about 350° F. for a period of approximately three hours, said solution having a pH of from 8.5 to 10.

BENJAMIN R. BURGESS.
MILLIE M. BURGESS.

REFERENCES CITED

The following references are of record in the file of this patent:

UNITED STATES PATENTS

| Number | Name | Date |
|---|---|---|
| 821,947 | Melton | May 29, 1906 |
| 997,601 | Carnell | July 11, 1911 |
| 1,028,669 | Blassneck | June 4, 1912 |
| 1,520,197 | Meeks | Dec. 23, 1924 |
| 2,106,294 | Chubbuck | Jan. 25, 1938 |
| 2,178,675 | Thomas | Nov. 7, 1939 |
| 2,215,446 | Wilson | Sept. 17, 1940 |